United States Patent [19]
Millerbernd et al.

[11] Patent Number: 5,404,802
[45] Date of Patent: Apr. 11, 1995

[54] CHEESE TOWER

[75] Inventors: Ralph J. Millerbernd, Winsted; Alan J. Blackwell, Mound; David P. Schmitz, Glencoe, all of Minn.

[73] Assignee: Millerbernd Design & Fabrication, Whisted, Minn.

[21] Appl. No.: 271,065

[22] Filed: Jul. 6, 1994

[51] Int. Cl.$^6$ ............ A01J 11/06; A01J 25/00; A01J 25/11; A23C 19/00
[52] U.S. Cl. ............... 99/454; 99/456; 99/460
[58] Field of Search ............... 99/452–459, 99/460, 461, 465; 100/104, 126, 127; 425/85, 147, 308, 444; 426/491, 486, 478, 517, 36

[56] References Cited

U.S. PATENT DOCUMENTS

| | | | |
|---|---|---|---|
| 3,802,332 | 4/1974 | Fassbender et al. | 99/452 |
| 3,871,801 | 3/1975 | Buchmann | 425/444 |
| 4,061,794 | 12/1977 | Charles | 426/486 |
| 4,137,836 | 2/1979 | Megard | 99/454 |
| 4,152,101 | 5/1979 | Charles | 425/85 |
| 4,237,781 | 12/1980 | Charles | 99/459 |
| 4,420,296 | 12/1983 | Anderson | 425/444 |
| 4,539,902 | 9/1985 | Brockwell et al. | 99/456 |
| 4,976,980 | 12/1990 | Yntema | 426/495 |
| 5,001,972 | 3/1991 | Greenfield et al. | 99/458 |
| 5,146,845 | 9/1992 | Pittelko | 99/465 |
| 5,243,900 | 9/1993 | Pittelko | 99/461 |

Primary Examiner—Timothy F. Simone
Attorney, Agent, or Firm—James R. Cwayna

[57] ABSTRACT

A cheese formation tower wherein cheese curds and attendant whey are introduced into the upper portion of a vertical, low friction material lined, tower and the whey is extracted through gravitational, differential pressure/relative vacuum and vibration techniques. As the material reaches the lower portion of the tower the whey has been substantially extracted to provide the formed cheese product. A guillotine or cutting arrangement is provided to cut the formed cheese to suitable lengths which are then extracted from the tower. The invention is particularly directed to cheese units of various shapes and sizes but preferably smaller than the standard, 11"×14", 40# block. The unit includes cleaning means for cleansing of the entire unit following complete batch formation. The tower ensures satisfactory whey removal and the delivery of properly formed cheeses.

17 Claims, 5 Drawing Sheets

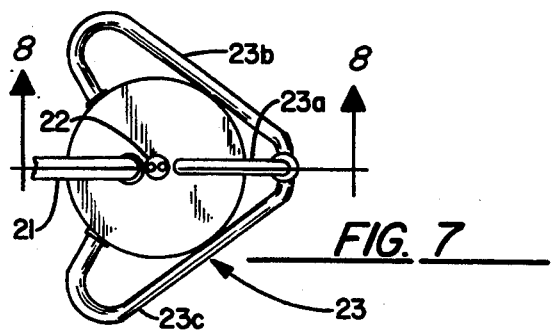
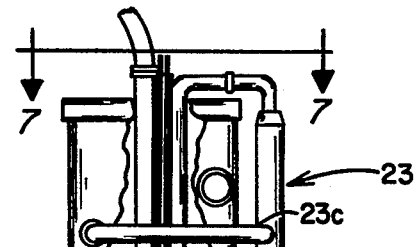
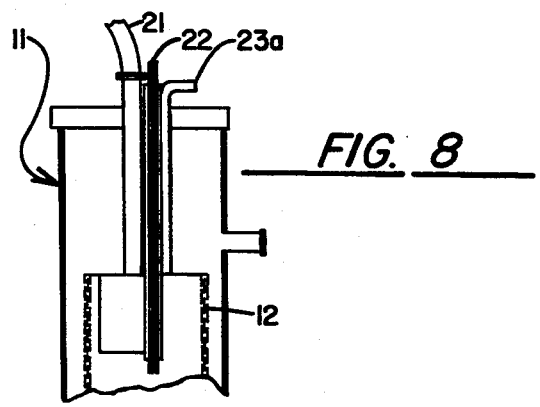
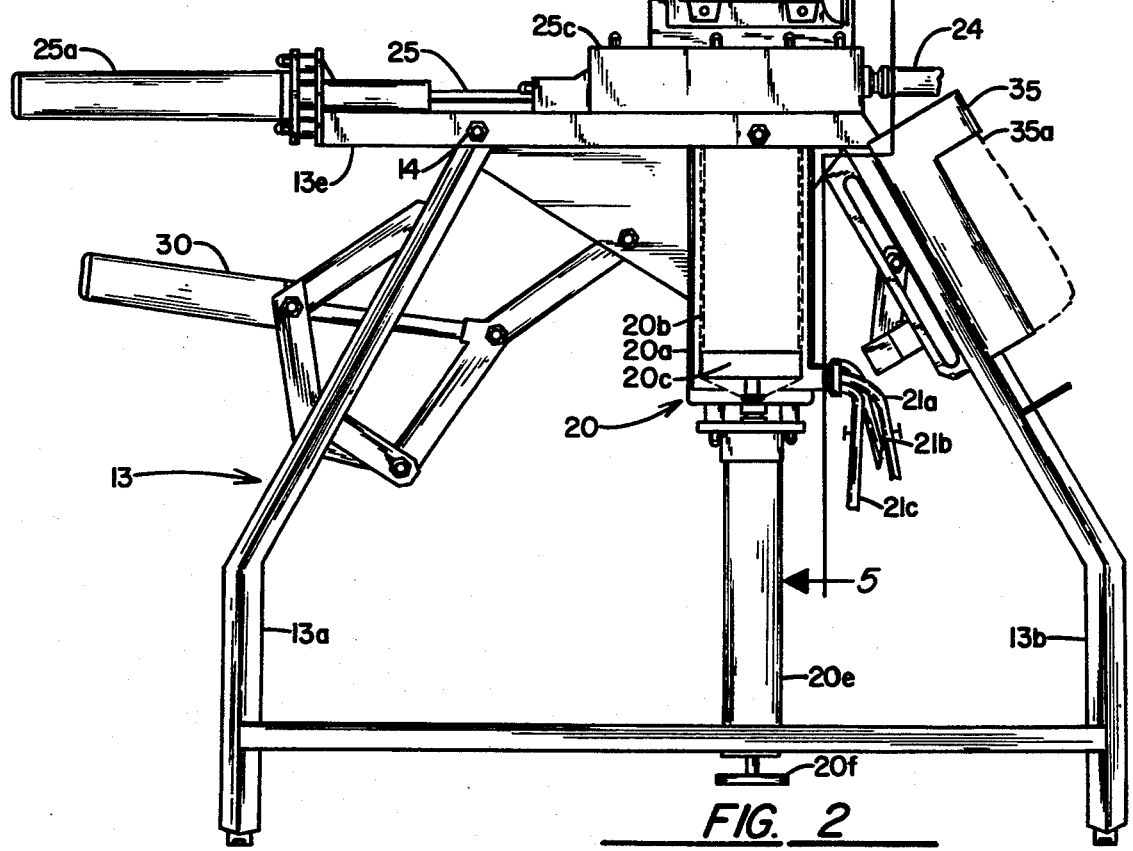

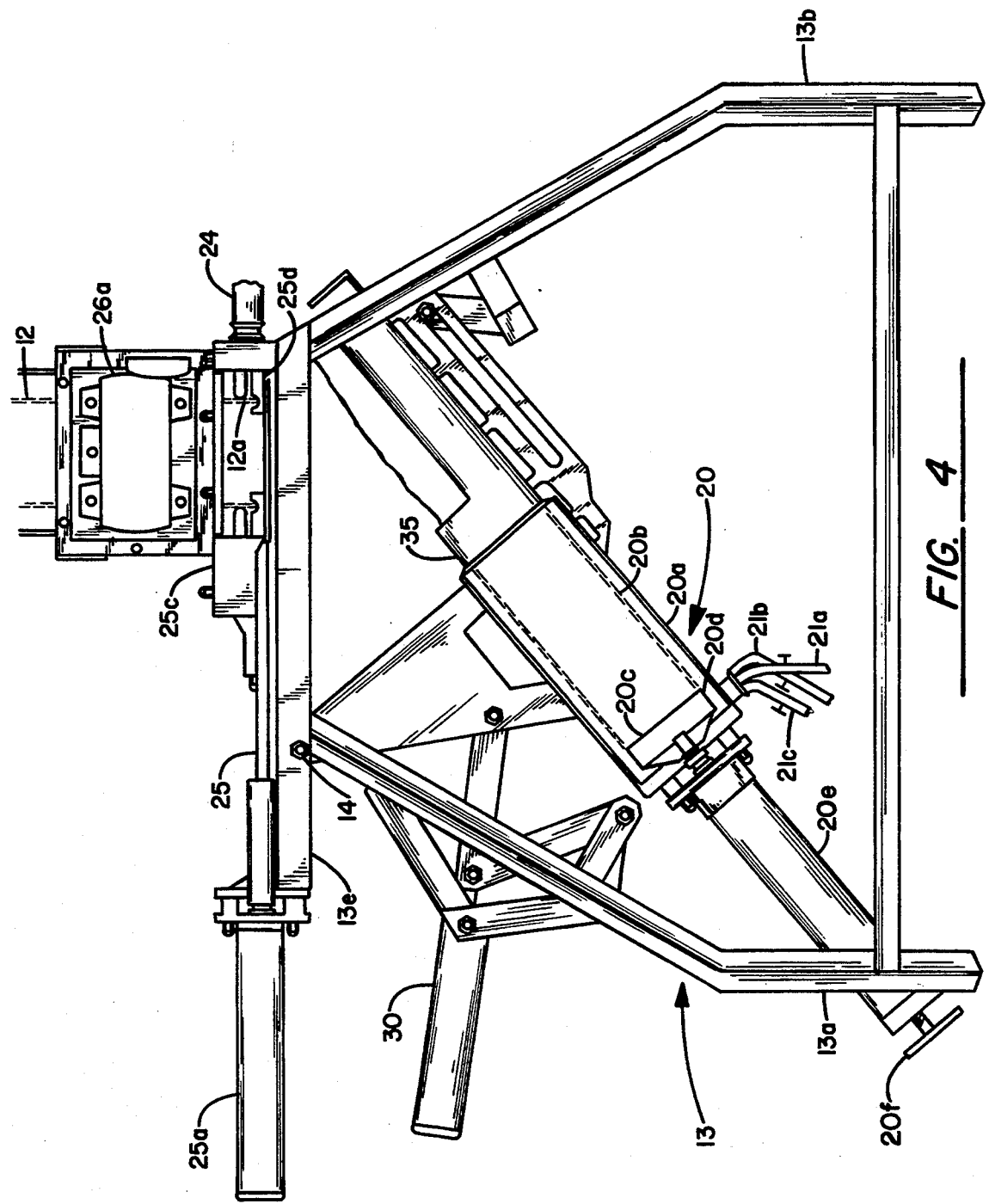

CHEESE TOWER

RELATED APPLICATIONS

There are no applications in the United States Patent Office currently on file to the knowledge of the inventors which should be considered with regard to the prosecution of this application.

FEDERAL SPONSORSHIP

This invention has not been made under any federally sponsored research and development arrangement nor under any other research and development program.

FIELD OF THE INVENTION

This invention relates generally to the formation of cheese and more particularly to the formation of cheeses of various shapes but which are typically smaller than a traditional and common 11"×14", 40# block.

SUMMARY OF THE INVENTION

To achieve the aspects of the invention the cheese tower, in the singular arrangement described, includes a pair of cylindrically formed, concentrically arranged towers. The first tower provides an exterior housing and the second tower provides a perforate, low friction lined or surfaced, interior housing designed to receive a mixture of curd and whey previously produced in a cheese formation machine.

The curd and attendant whey are introduced into the upper end of the inner, low friction, perforate housing and are directed downwardly therethrough by a combination of gravity, relative vacuum or differential pressure and vibration to provide for the satisfactory removal of whey from the curd. At the lower end of the interior housing a compact curd is provided.

A guillotine system or knife arrangement is provided at the lower end of the interior housing for cutting of the formed curd.

In the singular arrangement described, a receiving and removal cartridge unit, having additional whey drainage means for final removal of whey, is provided to receive the cut lengths. This cartridge unit is shiftable from a receiving position to a delivery position whereby the now cut lengths of cheese are received from the tower and are shifted to an alternate, delivery, position. This alternate position allows for bagging or other packaging of the formed cheeses.

BACKGROUND AND OBJECTS OF THE INVENTION

The utilization of cheese towers for the formation of cheese in the form of blocks has long been known in the art.

Primarily, curd and attendant whey has, after being stirred or cut into an easily transportable particulate consistency and size, been introduced into vertical cheese towers where the gravitational effect causes curd compaction resulting in whey removal, and the finally compacted, generally rectangularly formed curd body is cut into desired block sizes. The aspect of such formation has not been, to date, utilized for the formation of cheeses smaller than the standard 40# block or to cheeses of shapes other than rectangular. Similarly, tower formation has relied primarily on the effect of gravity for whey extraction and curd compaction.

With the cheese tower disclosed herein, the provided curd and whey mixture is introduced to the upper end of a perforate, low friction, cheese formation tower and through a combination of gravity, differential pressure/relative vacuum and vibration, whey is more rapidly removed to more rapidly provide the desired curd consistency which, at the same time, permits the production of smaller and varied cross-sectional shapes of cheeses.

As stated in the prior art statement the primary previous patents are to Brockwell, et al and Fassbender, et al.

Cheese towers have been primarily utilized in the formation of blocks of cheese and have not been directed to the formation of cheeses of horn, round or other shape variations smaller than the aforementioned 40# block.

Through the utilization of combinations of relative vacuum/differential pressure, gravity and vibratory techniques, along with low friction material, the applicants have provided a system which permits the consistent and economic production of smaller and potentially complex curd bodies in whey free condition and desired formed structure.

It is therefore an object of the applicants' invention to provide a cheese tower for the production of cheeses of various shapes which are smaller in cross section than the standard 40# block.

It is a further object of the applicants' invention to provide a cheese tower and delivery combination for the receipt of curd and whey and the removal of the whey such that the resultant curd body is provided in useable condition in a desired cross sectional shape and length.

It is a further object of the applicants' invention to provide a cheese tower that ensures proper removal of whey from a curd and whey combination to provide a product that is removeable from the tower and packageable in a desired shape and length.

It is still a further object of the applicants' invention to provide a cheese tower for whey removal from a whey and curd combination and to provide a cheese body of desired length and cross section in prepackaged condition.

These and other objects of the invention will more fully appear from a consideration of the accompanying disclosure and drawings.

DESCRIPTION OF THE DRAWINGS

FIG. 2 is a generally central vertical section similar to FIG. 1 which illustrates the internal housing through the tower and discharge area;

FIG. 4 is a view particularly illustrating the discharge or receiving portion of the unit in its removal condition wherein the formed cheese has been cut and extracted from the receiving position;

FIG. 7 is a partial, top plan view of the unit taken substantially along Line 6—6 of FIG. 2 which particularly illustrates the cleansing water flow lines for cleaning of the unit;

FIG. 8 is a view illustrating the inlet end of the tower and taken substantially along Line 8—8 of FIG. 2;

DESCRIPTION OF A PREFERRED FORM OF THE INVENTION

Figure 1:
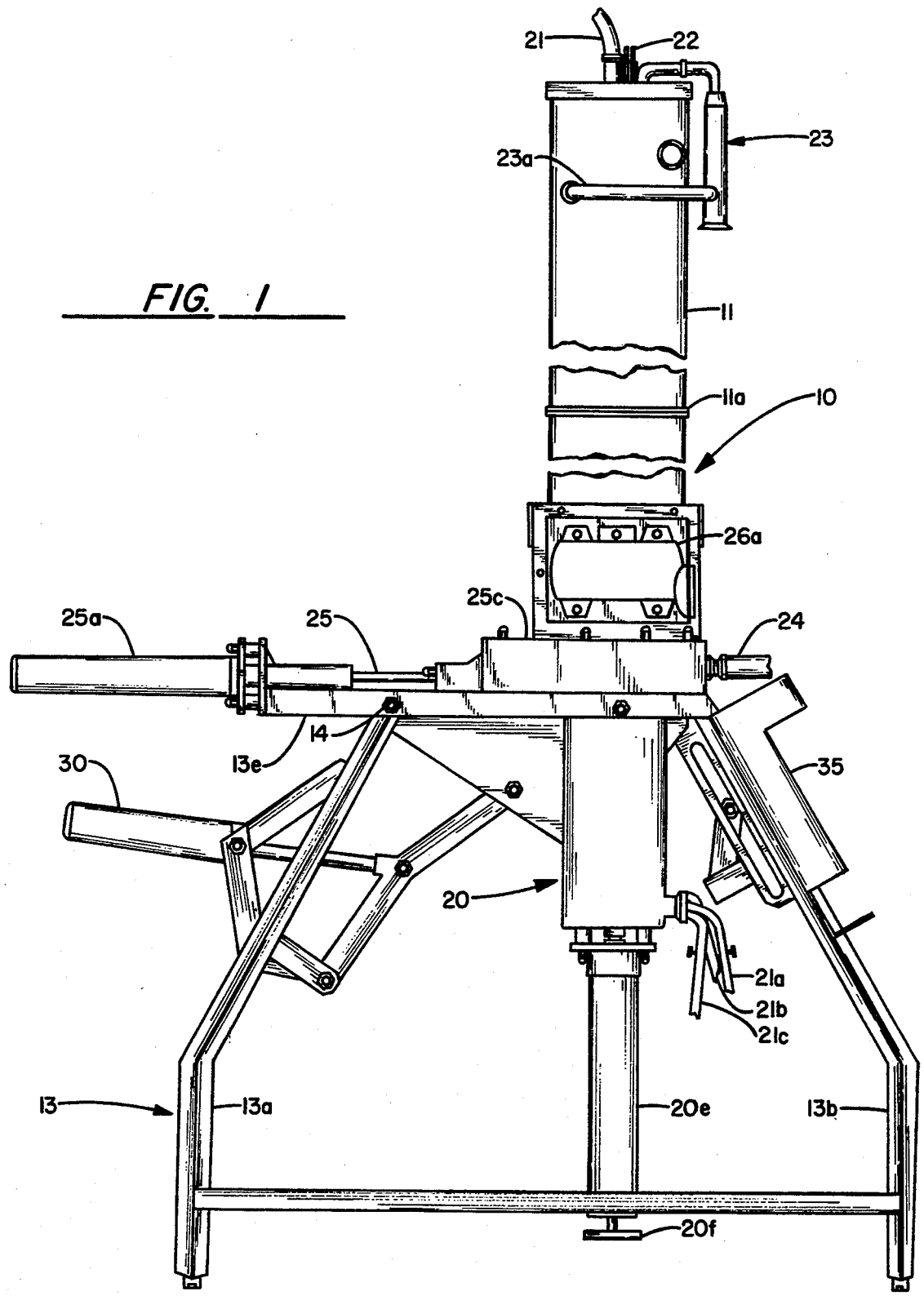
FIG. 1 is a side elevation of a cheese tower embodying the applicants' invention wherein the cheese tower length has been broken to accommodate the required drawing sizes and wherein a single tower unit is provided.

In accordance with the accompanying drawings, the entire cheese tower is designated 10. The unit includes an exterior, cylindrical housing 11 and an internal, perforate, lined, cylindrical housing 12. As illustrated, the exterior housing 11 and interior housing 12 are spaced from one another for the removal of whey from the interior cylindrical housing 12 through the perforations thereof to basically draw the attendant whey from the curd. As also illustrated in FIGS. 1 and 2, a connective break 11a is provided in at least the exterior housing 11 to assist and provide for transportation and assembly of the unit 10.

The height of a cheese tower 10 may prohibit its assembled transfer and such a break 11a will allow for transfer and in place assembly.

This set of drawings, description and claims are directed to a singular tower arrangement. It should be understood that the unit could be developed from a plurality of interior housings 12 arranged within a single exterior housing 11 with the whey being collected from the inner housings 12 through a collective system. It should also be understood that such a multiple arrangement may result in a multiple delivery system in which a formed cheese bodies would be delivered from each interior housing to a multiple reception cassette. Similarly, the same reception and delivery devices as are described herein could be provided with such a multiple tower arrangement.

As illustrated, a supporting framework, generally designated 13 is provided. This framework 13 provides a plurality of legs 13a, 13b, 13c, 13d.

A top plate 13e is positioned on the upper end of said framework 13 to underlie the upper tower 11 and to carry the cutting guillotine or knife 25. This top plate 13e also provides the pivotal connection 14 of the receiving and discharge portion 20 to the curd conveying section 12 of the unit 10.

In FIGS. 7 and 8 the upper end of the tower 10 is illustrated. FIG. 7 illustrates the whey and curd inlet 21, a level sensing gauge 22 and cleaning water inlets designated respectively 23a, 23b and 23c. Compositely these inlets are designated 23. Cleaning water inlet 23a is directed interiorly of the interior housing 12 while water flow inlets 23b, 23c are directed exteriorly of the interior housing 12 to allow flow between exterior housing 11 and interior housing 12. These units are only activated after batch formation to provide for thorough cleaning of the entire tower after a particular batch completion.

Figure 9:
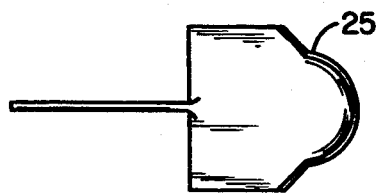
FIG. 9 is a view of the guillotine or knife provided to cut the formed cheese.
Figure 6:
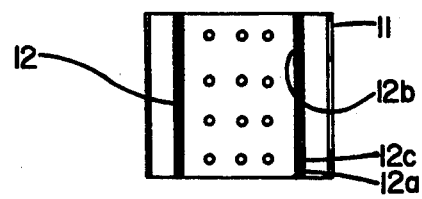
FIG. 6 is a section taken substantially along Line 6—6 of FIG. 2 illustrating the interior of the inner tower unit to particularly show the lining and perforations thereof.
Figure 5:
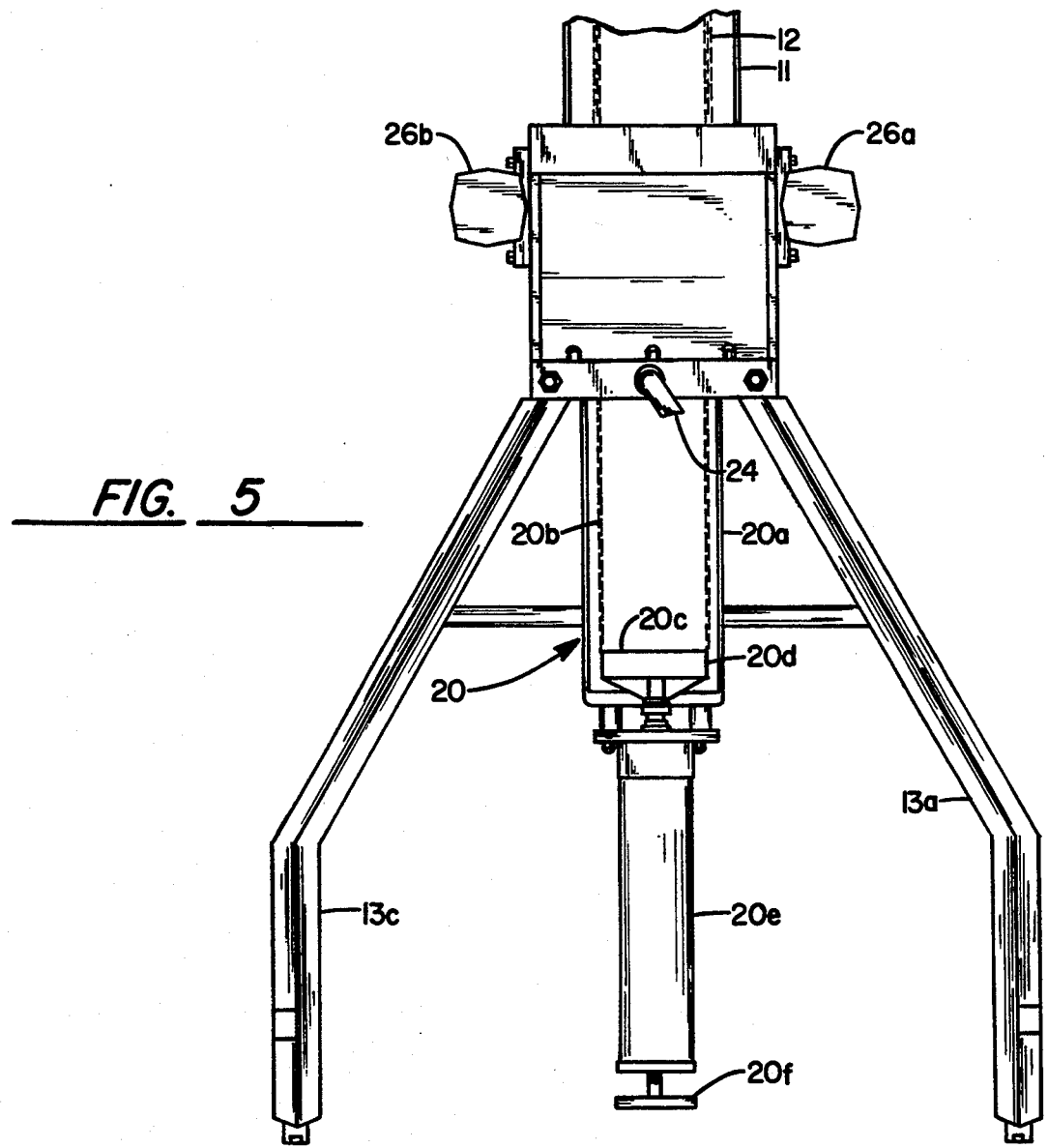
FIG. 5 is a section view taken substantially along Line 5—5 of FIG. 2.

FIG. 9 illustrates the cross section of the interior housing 12 within exterior housing 11. Specifically, interior housing 12 includes an outer member 12a, preferably of steel, aluminum or other high strength material which would include certain plastics and an inner, low friction member 12b such as a high density polymer to substantially provide a low friction surface. These members 12a, 12b are bonded or mechanically cohered.

A plurality of passages 12c are formed through such inner 12b and outer 12a member to allow for passage of whey therethrough into the area exterior of longitudinal housing 12 and the interior of longitudinal housing 11. Although not illustrated, these passages may comprise simple circular openings or may be of a more desirable form such as a conical shape wherein the passages 12c are of greater diameter at the juncture with the outer member 12a and decreasing radially to a smaller passage at the juncture with the inner member 12b. Such a conical passage could be formed in this unit by simply countersinking a drilled hole from the exterior member 12a to the inner member 12b. It has been found that such a conical formation does assist in whey flow therethrough.

The aspect of the level sensor 22 should be obvious. When the level of the mixture of curd and whey delivered to the interior perforate housing 12 reaches a desired level or predetermined level the flow of curd and whey into this interior chamber 12 is stopped. A control valve (not shown) is provided to control the curd and whey introduction.

Also, arranged at the lower end of the tower 10 are at least a pair of vibratory devices 25a, 25b which will impart vibratory motion to the tower 10. These vibratory devices 25a, 25b will assist in the removal of the liquid whey from the curd, due to oscillation of the same, to afford a proper formation of the curd into the discharge area designated 20.

Figure 3:
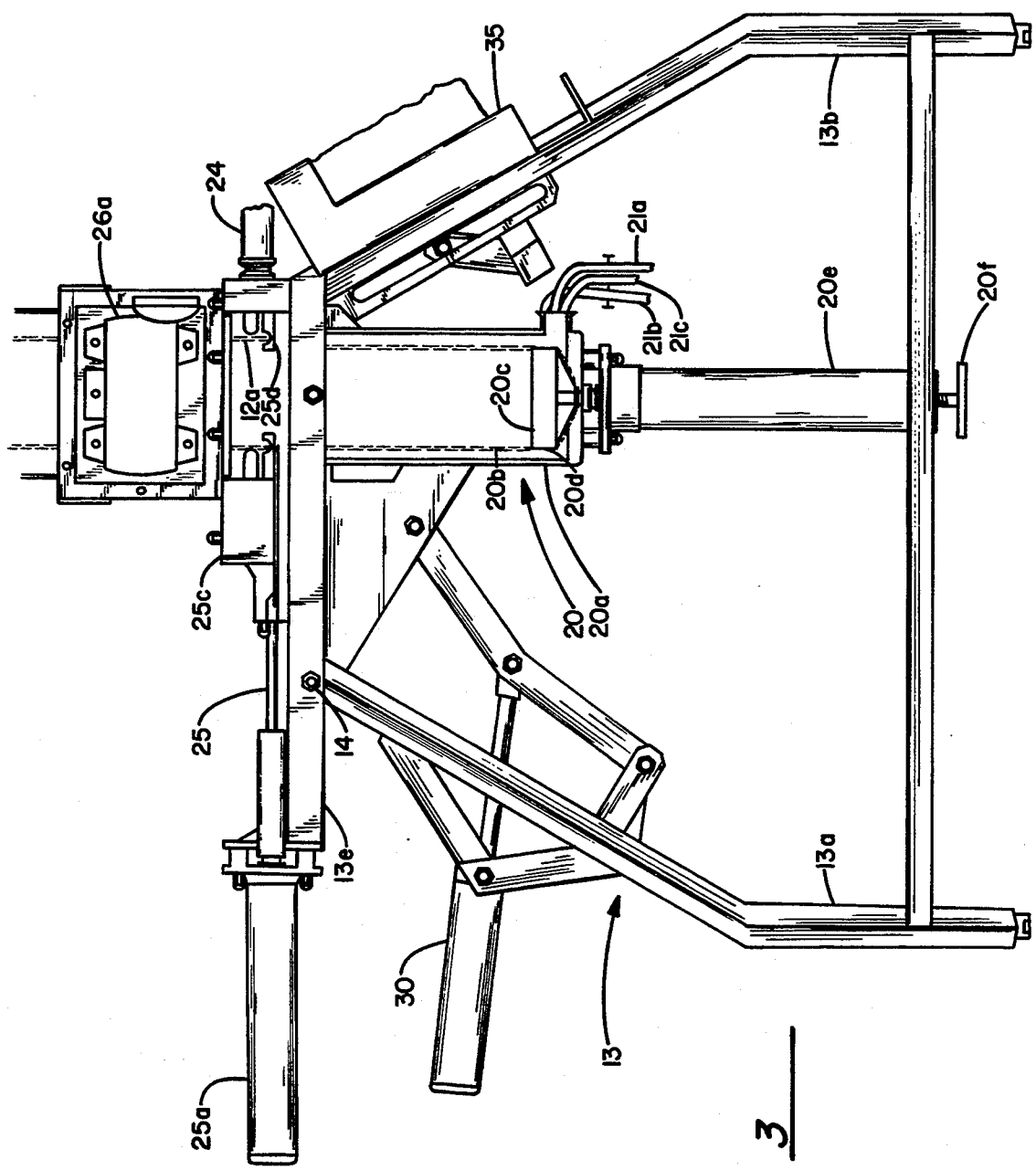
FIG. 3 is a view particularly illustrating the discharge or receiving portion of the unit in a first position.

Arranged on platform 13e is the guillotine or knife section arrangement. This section includes block 25c secured to platform 13e and through which the knife 25 slides for cutting of the formed cheese. This knife is powered by a controlled, power cylinder 25a. As illustrated, particularly in 3 and 4 block 25c also incorporates a support ring 25d for receiving the bottom edge of the interior, perforate cylinder 12a. As illustrated in FIG. 3, knife 25 is withdrawn to allow communication between the upper portion of the perforate cylinder 12, the lower portion 20b underlying plate 13e through which the cheese passes into the receiving recepticle 20. FIG. 3 illustrates the knife 25 in open position to allow such communication and FIG. 4 illustrates knife 25 in closed position which, after cutting the cheese body will prevent further passage of cheese from the upper to the lower portion of the perforate cylinder. It should be noted that the knife 25 will be in close communication with the support ring 25d to ensure that no cheese will pass thereby when the receiving unit 20 is shifted from its receiving to its delivery position.

Also arranged in this knife block 25c is a relative vacuum or pressure differential source and whey extraction tube 24. The aspect of this whey extraction tube and relative pressure source element 24 is to provide a more positive means for removal of whey that has accumulated in the area between the internal perforate cylinder 12 and the exterior housing 11.

The discharge and receiving area 20 includes an exterior housing 20a and an interior perforate housing 20b. An adjustable platen 20c is arranged adjacent the lower end 20d of the interior housing 20b for receipt of the formed curd thereon. An adjustable cylinder 20e is provided to maintain and retain the delivered length of the formed cheese into the discharge area 20 and is provided with vacuum relief 21a, whey relief 21b and liquid relief 21c apertures to allow for the continued removal of whey and liquid and proper formation of the curds.

The aspect of discharge unit 20 is to allow cutting of the formed cheese by the guillotine or knife 25 through operation of the drive mechanism 25a and to compress the formed cheese upwardly against the bottom surface of the guillotine or knife to further press the whey from the formed curd.

It should be noted that the movement of the platen 20c may be adjusted such that the length of the formed curd is controllable through control member 20f.

After the formed cheese has been shifted into the discharge and receiving unit 20, unit 20 is swung into the position illustrated in FIG. 4. This movement is accommodated by initially pivoting unit 20 about pivot 14 as driven by hydraulic mechanism 30.

At this point the formed cheese is within the discharge and receiving section 20. Actuation of the hydraulic cylinder 20e will force the formed cheese into delivery receptacle 35. This receptacle 35 is so formed as to allow for the placement of a receiving bag thereover. Repositioning of the receiver unit 20 as illustrated in FIGS. 3 and 4 will now shift the delivery unit 35 with the bagged or packaged cheese being removeable from receptacle 35 and will again replace the recepticle 20 into underlying position to receive formed curd bodies from tower 12.

Basically the inventors have provided a simplified two step situation wherein curd bodies having a substantial amount of whey removed therefrom are delivered to a discharge unit and this discharge unit affords further removal of whey and is shiftable to a delivery position.

The inventors have provided a unit which is capable of whey removal by differential pressure, relative vacuum, vibration, and gravity for rapid removal of whey from the curds and provide a properly formed curd consistency.

It should be obvious that the frame work 13 may also be vibratorily exercised to assist in or eliminate the vibratory controls 26a, 26b. It should be obvious that the framework 13 could be equally vibrated to achieve the same affect as is done through the vibratory units 26a, 26b.

The invention as disclosed herein primarily provides a unit which will rapidly and effectively remove whey from curds to provide cheeses of selected shapes and lengths and which will receive the formed curds and deliver the same to an accessible position.

Although the applicants have illustrated a cheese tower unit which includes only a pair of longitudinal extending housings, it should be obvious that the concepts thereof are easily expandable to a unit which would provide a plurality of interior longitudinal housings 12 arranged within a single exterior housing 11. Obviously, such an arrangement would substantially increase the formed curd output from the unit without totally departing from the scope of the invention. Such a multiple device could be utilized with the single delivery method described and discussed in this application with such single delivery unit being movable between the lower ends of the individual inner, curd forming units. Similarly, a delivery device as illustrated, including guillotines or knifes for each curd forming tower could be provided which would not require shifting of the same. Again, applicants have envisioned the aspect of rotation of the curd forming housings over a single guillotine or knife provided delivery portion. It should be obvious that all of such multiple applications, except for specific structures required, would increase production and could utilize the basic teachings of this application.

What is claimed is:

1. Apparatus for the formation of cheeses of various shapes, the apparatus including:
    a. a frame having a substantially flat, horizontally disposed upper surface, said upper surface having a cheese passing passage therethrough;
    b. cutting means and a cutting means housing arranged on said upper surface, having a cheese passage therethrough which passage is in alignment with said passage through said upper surface of said frame;
    c. an upwardly directed, generally vertical tower having an upper end and a lower end, including a tubular outer member and at least one smaller perforate tubular member interiorly of said outer member providing a whey flow space between said outer tubular member and said at least one of said smaller perforate tubular members;
    d. at least said perforate member extending into said cutting means housing in alignment with said cheese passing passage for the delivery of formed cheese therethrough;
    e. at least one cheese receiving unit below said horizontally disposed surface and cutting means housing including a longitudinally extending exterior housing of a first cross section and a perforate interior housing of a smaller cross section, the formed cheese being received from said longitudinally extending housing into said interior housing;
    f. means for introducing a curd and attendant whey mixture into the upper end of said perforate tubular member such that the mixture will move downwardly therein to thereby compress the curd body permitting and forcing whey therefrom to exit said tubular member through said perforations;
    g. means for actuating said cutting means for cutting lengths of cheese received into said cheese receiving unit; and
    h. said cheese receiving unit being shiftable from a cheese receiving position to a delivery and cheese removal position.

2. The cheese forming apparatus as set forth in claim 1 and at least the inner surface of said perforate interiorally arranged tubular member including being formed of a low friction material.

3. The cheese forming apparatus as set forth in claim 1 and said inner surface of said perforate tubular member being provided of a high density polymer.

4. The cheese forming apparatus as set forth in claim 1 and the perforations of said inner tubular member including conical passages.

5. The cheese forming apparatus as set forth in claim 4 and said conical passage providing an opening of larger diameter on the exterior surface of said member.

6. The cheese forming apparatus as set forth in claim 1 and:
    a. a platen arranged within said perforate interior housing of said cheese receiving unit; and
    b. said platen being longitudinally shiftable within said housing of said cheese receiving unit whereby the length of formed cheese to be cut is controllable.

7. The cheese forming apparatus as set forth in claim 6 and a delivery receptacle associated with said cheese receiving unit to receive cheese therefrom when said unit has been shifted from said cheese receiving position to said delivery position.

8. The cheese forming apparatus as set forth in claim 7 and said platen being shiftable within said interior housing of said cheese receiving unit to displace the cheese therefrom into said receptacle when said cheese receiving unit has been shifted to said delivery position.

9. The cheese forming apparatus as set forth in claim 7 wherein;
   a. drive means connected to said cheese receiving unit, being pivotally mounted with respect to said upper surface for shifting said cheese receiving unit from said receiving position to said delivery and removal position;
   b. said receptable being brought into alignment with said interior housing of said cheese receiving unit to receive cheese therefrom when said platen is shifted to displace the cheese into said receptacle; and
   c. said receptacle associated with said cheese receiving unit for movement thereof into delivery and removal position upon shifting of said cheese receiving unit to said receiving position.

10. The cheese forming apparatus as set forth in claim 1 and level sensing means associated with said upper end of said tower and said perforate tubular member to control delivery of curd and whey thereto.

11. The cheese forming apparatus as set forth in claim 1 and vibratory means associated with said tower to vibrate at least said inner perforate member.

12. The cheese forming apparatus as set forth in claim 11 wherein said vibrator means is associated with said frame.

13. The cheese forming apparatus as set forth in claim 1 and whey delivery means associated with said cutting means housing to receive whey from the space between said outer tubular member and said inner tubular, perforate member.

14. The cheese forming apparatus as set forth in claim 13 and relative pressure means associated with said whey delivery means to assist in whey extraction.

15. The cheese forming apparatus as set forth in claim 1 and means from delivering cleaning fluids to said upper end of said vertical tower.

16. The cheese forming apparatus as set forth in claim 14 wherein said means for delivering cleaning fluids includes means for delivering the same interiorly of said perforate inner member and exteriorly thereof for positive cleaning of all surfaces of said members.

17. The cheese forming apparatus as set forth in claim 15 including means for draining cleaning fluids and whey by providing relative pressure to said cheese receiving unit.

* * * * *